United States Patent [15] 3,699,156
Holland et al. [45] Oct. 17, 1972

[54] FLUORINATED CYCLIC ALCOHOL AND THEIR ESTERS

[72] Inventors: Dewey G. Holland, Allentown; Ronald C. Moyer, Sellersville; John H. Polevy, Allentown; Robert A. Walde, Emmaus, all of Pa.

[73] Assignee: Air Products and Chemicals, Inc., Allentown, Pa.

[22] Filed: Jan. 24, 1968

[21] Appl. No.: 700,029

Related U.S. Application Data

[63] Continuation-in-part of Ser. No. 608,510, Jan. 11, 1967, Pat. No. 3,600,433.

[52] U.S. Cl............260/486 H, 204/59 R, 252/8.6, 260/468 R, 260/544 F, 260/617 R
[51] Int. Cl.................................................C07c 69/54
[58] Field of Search.................................260/486 H

[56] References Cited

UNITED STATES PATENTS

| | | | |
|---|---|---|---|
| 3,283,012 | 11/1966 | Day | 260/617 R |
| 2,593,737 | 4/1952 | Diesslin et al. | 260/514 |
| 2,717,871 | 9/1955 | Scholberg et al. | 260/514 X |
| 3,249,596 | 5/1966 | Pierce et al. | 260/486 X |
| 3,409,647 | 11/1968 | Pittman et al. | 260/408 |
| 3,424,785 | 1/1969 | Pittman et al. | 260/468 |

OTHER PUBLICATIONS

Noller; Chem. of Organic Compds. 2nd Ed. 1960, pg. 161, 165, 172.

*Primary Examiner*—Lorraine A. Weinberger
*Assistant Examiner*—Paul J. Killos
*Attorney*—B. Max Klevit and J. M. Hersh

[57] ABSTRACT

Perfluoro-cyclohexane carbonyl fluoride and perfluoro (alkyl cyclohexane) carbonyl fluorides, obtained by electrolytic fluorination, are converted to esters and reduced to the corresponding α, α-dihydrocarbinol compounds. The fluorinated carbinol compounds are useful as textile treating agents, or these compounds as intermediates can be converted to polymerizable materials suitable for imparting oil and water repellency to textile fabrics and other surfaces. Examples describe the reaction of such polyfluorinated cyclic carbinols with acrylyl and methacrylyl halides to obtain these polymerizable monomers, and the formation of homopolymers, copolymers and segmented copolymers therefrom.

8 Claims, No Drawings

FLUORINATED CYCLIC ALCOHOL AND THEIR ESTERS

CROSS REFERENCE AND BACKGROUND OF INVENTION

The present application is a continuation-in-part of our copending parent application Ser. No. 608,510 filed Jan. 11, 1967, now U.S. Pat. No. 3,600,433.

In said prior patent application certain novel processes are described for electrolytic fluorination of aromatic carboxylic acids or their acidogenic analogues, particularly applied to the fluorination of alkyl benzoic acids or acid halides obtaining novel perfluorinated cyclohexane carbonyl fluorides in exceptionally high yields. The perfluoro-cyclohexane carbonyl fluorides obtained by the methods disclosed in the aforesaid application, are converted to polymerizable esters or other polymerizable derivatives retaining the carbonyl function, which polymers are shown to be effective as treating and modifying agents for textile fabrics and other surfaces, imparting exceptionally high oil and water repellency. Among the reactions described in the said application is the conversion of crude electrolytic cell product, consisting principally of perfluorinated cyclohexane carbonyl fluoride, to the corresponding perfluoro cyclohexane carbinol. This conversion is achieved by esterification of the fluorinated cell product with an alcohol, such as ethyl alcohol, to form the corresponding alkyl ester which is then reduced to the carbinol. The obtained fluoro-carbinol can be converted to a polymerizable fluoro ester monomers by reaction with an unsaturated acid halide, such as acrylyl or methacrylyl chloride, which esters are readily polymerizable and are useful as fabric treating agents.

The present application is an extension of the disclosure in said parent application and is particularly directed to production of a wide range of polyfluorinated cyclohexane carbinols and their conversion to novel polymerizable esters and polymers thereof.

ELECTROLYTIC FLUORINATION

The fluorination is conducted in an electrolytic cell essentially of the type described in U.S. Pat. No. 2,519,983.

The outer body and lid of the cell were constructed of Monel metal. The electrode pack was a series of alternately spaced nickel anode and cathode plates. The place spacing was approximately ⅛ inch and the annulus between the electrode pack and the inner wall of the cylindrical cell was approximately 1 inch. The cell plates were 1/16 inch thick and were insulated from each other with polytetrafluoroethylene spacers. A condenser, through which the exit gases were passed, was cooled with a liquid $CO_2$ fed cold finger and maintained at about −30° to −40° C. The outer refrigerator jacket of the cell body was generally maintained between 20° to 60° F., by circulating a cooling liquid therethrough.

In cell operation in general, a 4,500 cc. volume cell, with a total anode area of 4.245 square feet, was loaded to capacity with liquid HF. Five volts of direct current were applied and increased over a period of time until the current drawn was below 5 amperes at an applied 7 volts indicating that the hydrogen fluoride was dry. To this dry electrolyte there was added about 10 percent by weight of the aromatic acid chloride charge. The electrolyte temperature was generally maintained between 35° to 65° F. throughout the process by operation of the jacket coolant system. The voltage applied was in the range of about 7 to 9 volts, providing a current density between 5 to 10 amperes per square foot of anode area. No product precipitated in the cell until a critical concentration had been reached which exceeded the solubility of the product in the electrolyte mixture. With the continuous passage of current and the progressive addition of organic charge stock, the production of fluoroorganic product became noticeable as a precipitate. After a certain amount of initial precipitate was formed, further production of fluorinated product was at an increasing rate until a substantially steady high rate was attained.

At every 24 hours period product was drained from the bottom of the cell and aromatic acid chloride was added through a stoppered opening in the top of the cell. Each fresh charge was added to the cell based on the consumption of electrical power. Approximately a 2 mole excess of fresh charge was maintained over and above the number of Faradays passed through the cell, divided by the number of Faradays required in the theoretical equation for the process Circulation of the electrolyte was effected in certain of the runs to maintain the desired current density. The electrolyte was pumped from the bottom of the cell, taken through an external line and reintroduced to the top of the cell at a flow rate of approximately 1 liter/minute, for a period of time (generally 15–30 minutes) sufficient to maintain the amperage at the desired level. The reverse order of pumping has been used and shown to produce the same effect. As the run proceeded in some instances, it became desirable to employ the circulation procedure at least once or twice daily. Reversal of electrode polarity which was also effective in increasing amperage, was carried out at least once every 24 hours.

The charge stock in each of the specific examples below was an aromatic or alkyl aromatic acid chloride. It is recognized, however, that the free acid, acid anhydride, ester, other acid halide or amide can be used effectively as charge stock since these acidogenic derivatives are converted to the acid fluoride in the presence of the large excess of anhydrous liquid hydrogen fluoride under cell operating conditions. Accordingly, free aromatic acids or their acidogenic derivatives are suitable charge stocks, with the acid halide preferred over the ester, acid or anhydride since the use of acid or anhydride as charge stocks will consume HF and release alcohol or water in the conversion of the charge to acid fluoride. The aromatic acid fluoride is the most suitable charge stock when available.

EXAMPLE I

The electrolytic fluorination of benzoyl chloride — The 4,500 cc. cell was charged with anhydrous HF and dried in the manner described above. Benzoyl chloride (3.2 moles) was introduced into the top of the cell and a voltage of 6.8 volts of direct current was applied. Product was collected and charge was added as described in Table 1. Charge addition and product collection, as indicated in this table, was done on a 24 hour basis. The voltage was maintained at 6.8 to 8.2 volts throughout the run. The composition of the product collected was determined by the esterification technique.

A vapor-phase chromatogram of the cell product (5 microliters) was run on a gas chromatograph, on a 15' silicone gum rubber on Chromasorb W column, programmed between 25°–300° C. at 30°/min. A small portion of cell product was esterified as above. When a chromatogram of the water insoluble esterified cell product was run, those components capable of esterification (acid fluorides) were identified by their extended chromatographic retention times. The product was found to be composed of 16.28 percent of fluorocarbons and 83.72 percent of esterifiable fluoroacid fluorides. Of the total product, 50.75 percent was found to be ethyl perfluorocyclohexane carboxylate; the remainder being composed chiefly of the corresponding isomeric ethyl perfluoro (methylcyclopentane) carboxylate and other heavily fluorinated carboxylate.

TABLE 1

| Cumulative Charge added to cell (moles/24 hr.) | Cumulative Faradays/24 hr. | Cumulative Liquid Product (grams/24 hr.) |
|---|---|---|
| 3.214 | 0.00 | 0 |
| 3.214 | 6.15 | 0 |
| 3.214 | 28.32 | 0 |
| 4.214 | 46.23 | 204 |
| 6.214 | 71.34 | 556 |
| 7.214 | 92.64 | 777 |
| 10.214 | 124.51 | 1,184 |
| 12.214 | 149.58 | 1,523 |
| 13.214 | 168.69 | 1,810 |
| 14.214 | 195.63 | 2,158 |
| 16.214 | 222.01 | 2,603 |

EXAMPLE II

The electrolytic fluorination of p-toluyl chloride — The 4,500 cc. cell was charged with anhydrous HF and dried in the previously described manner. p-toluyl chloride (2.9 moles) was introduced into the top of the cell and a voltage of between 6.4 and 8.6 volts, direct current, was applied. Product was collected and charge was added as described in Table 2. Charge addition and product collection, as indicated in this Table, was done on a 24 hour basis. The composition of the product collected was determined by esterification (ethanol) of the liquid product and chromatography as previously described. The product was found to be 25.51 percent non-functional fluorochemicals and 74.49 percent esterifiable fluoroacid fluorides. The anticipated ethyl perfluoromethylcyclohexane carboxylate was 53.56 percent of the total esterified product.

TABLE 2

| Cumulative Charge added to cell (moles/24 hr.) | Cumulative Faradays/24 hr. | Cumulative Liquid Produce (grams/24 hr.) |
|---|---|---|
| 2.922 | 0.00 | 0 |
| 3.922 | 3.76 | 0 |
| 4.922 | 12.57 | 0 |
| 4.922 | 23.17 | 0 |
| 5.922 | 43.65 | 0 |
| 7.922 | 68.50 | 320 |
| 8.922 | 96.23 | 599 |
| 10.922 | 120.59 | 822 |
| 12.922 | 153.43 | 1,217 |
| 13.922 | 187.72 | 1,775 |
| 15.922 | 213.65 | 2,227 |
| 17.922 | 243.95 | 2,534 |
| 18.922 | 277.50 | 3,023 |
| 18.922 | 304.36 | 3,237 |

EXAMPLE III

The 4,500 cc cell was charged with anhydrous HF and dried in the previously described manner. Then 4-ethyl benzoyl chloride (2.68 moles) was introduced into the top of the cell and a direct current of 7.6 volts, was applied. Charge was added and product was collected on a 24-hour basis.

No fluoro-compound was actually separated prior to the passage of 81 Faradays. At the passage of approximately 100 Faradays, less than 1.6 g of product per Faraday was precipitated. In the subsequent post-induction period 2,525 grams of fluoro-product were precipitated with the consumption of 271 Faradays, or at an average rate of over 9 grams/Faraday, almost 6 times the preinduction rate.

The composition of the cell product was determined by an esterification technique. A sample of cell product (10.0g) was added dropwise to 5.0 g of absolute ethanol while stirring the reactants at room temperature. After the addition was complete, the solution was heated at 70° C. for one hour and was then decanted into 50 ml. of water. After vigorous agitation, a lower phase was separated. A vapor-phase chromatogram of a 5 microliter sample of the esterified product was compared with a chromatogram of the nonesterified cell product. The materials whose retention times were lengthened by the esterification technique were considered to be ethyl esters of those fluorochemicals which retained the carbonyl function through the electrolytic fluorination process. The materials whose retention times remained the same in both the nonesterified and esterified sample were considered to be fluorocarbons which did not possess any carbonyl functionality. The total fluorination product was thus found to consist of 71.7 percent of fluoroacid fluoride. The principal component, perfluoro-(4-ethyl cyclohexane) carbonyl fluoride, was found to be at least 46.2 percent of the total product. Several other acid fluorides, were found to be present on the order of, at most, 25.5 percent of the total product. The total fluoroproduct constituting a technical grade of $C_2F_5C_6F_{10}COF$, had a boiling point of 121°–131° C. at 760 mm. Hg. The designation of $C_6F_{10}$ in the formula refers to a bisubstituted (usually 1,4-but comprising any isomeric 1,2 and/or 1,3) perfluoro cyclohexane group. Similarly, other esters were obtained from homologous perfluoroacid fluorides, which esters were carefully purified by gas-liquid chromatography. Data concerning the thus purified esters are tabulated as follows:

| | Refractive Index Carbon,% | | Ultimate Analysis Hydrogen,% | |
|---|---|---|---|---|
| | Theory | Found | Theory | Found |
| ethyl-perfluoro (-4-ethylcyclohexane) carboxylate | N(25.5/D)=B1.3306 | 29.1 | 1.11 | 1.05 |
| ethyl-perfluoro (4-n.butylcyclohexane) carboxylate | N(26.5/D)=B1.3307 | 28.1 | 0.91 | 0.93 |
| ethyl-perfluoro (-4-isopropylcyclohexane) carboxylate | N(22.0/D)=B1.3319 | 28.28 | 1.00 | 1.04 |

| | | | | |
|---|---|---|---|---|
| ethyl-perfluoro(-4-methylcyclohexane) carboxylate | N(24.0/D)=B1.3315 | 29.72 | 29.73 1.25 | 1.24 |
| ethyl perfluorocyclohexane carboxylate | N(30.0/D)=B1.3271 | 30.60 | 30.18 1.41 | 1.59 |

In similar manner other alkyl aromatic carbonyl chlorides were fluorinated obtaining good yields of the corresponding perfluoro-carbonyl fluorides, e.g., 4 n-butyl benzoyl chloride, as more fully described in the aforesaid parent application.

CONVERSION TO CARBINOL

EXAMPLE IV

Preparation of ethyl perfluorocyclohexane carboxylate 800 g of liquid product obtained from the electrolytic fluorination of benzoyl chloride was added to 500cc of absolute ethanol.

After several hours at room temperature, the solution was washed with water, NaHCO$_3$, and water, followed by drying with MgSO$_4$. The yield of ester was 535 g. The ester distilled between 71°–83° C. at 12mm. Hg.

Anal. Calc'd for C$_9$F$_{11}$H$_5$O$_2$: C, 30.6; H, 1.41; F, 59.0
Found: C, 30.18; H, 1.59; F, 54.0

Preparation of ethyl perfluoro-4-methylcyclohexane carboxylate

This ester was prepared in a similar manner as ethyl perfluorocyclohexane carboxylate. From 670 g of cell drainings obtained from the electrolytic fluorination of p-toluyl chloride was obtained 589 g of ester. The boiling range for this ester is between 73°–85° C. at 12mm. Hg.

EXAMPLE V

Preparation of α,αDihydro-perfluorocyclohexane carbinol 4.75 g of LiAlH$_4$ was added to 300 cc of anhydrous ether, and after stirring for 7 hours., the flask was immersed in an ice bath and 65.4g of ethyl perfluorocyclohexane carboxylate was slowly added.

The ice bath was removed and the reaction allowed to continue at room temperature for 2 hrs., after which time the excess metal hydride was destroyed by the addition of ethanol at −10° C. After hydrolyzing with a cold solution of dilute H$_2$SO$_4$, the two layers were separated, and the aqueous layer extracted with ether and the combined ether solution washed with water. After drying and removing ether, 53.0g; 90 percent yield of carbinol was obtained. The carbinol had a boiling range between 135°–146° C. at atmospheric pressure.

Anal. Calc'd. for C$_7$F$_{11}$H$_3$O; C, 27.0: H, 0.96: F, 67.0
Found: C, 26.8; H, 0.60; F, 72.5

Preparation of α,αDihydro perfluoro-4-methylcyclohexane carbinol

Dihydro perfluoro-4-methylcyclohexane carbinol was prepared in a similar manner. From 233 g of ethyl perfluoro-4-methylcyclohexane carboxylate was obtained 114.5 g of distilled alcohol, having a boiling range between 58°–76° C. at 10mm. Hg.

EXAMPLE VI

Preparation of ethyl perfluoro-(4-n. butyl cyclohexane) carboxylate (A) Crude cell product (466 g) obtained from the electrolytic fluorination of 4-n.butylbenzoyl chloride was added to 185 g of absolute ethanol. After several hours at room temperature, the solution was washed with water, sodium bicarbonate solution, and again with water, followed by drying over magnesium sulfate. The yield of ester designated as ethyl perfluoro-(4-n-butylcyclohexane) carboxylate was 394 g. Ethyl esters of perfluoro ethyl, perfluoro propyl and higher perfluoro alkyl cyclohexane carboxylic acids were prepared in like manner.

(B) Preparation of Perfluoro-(4-ethylcyclohexane) carbinol. Into a 3-liter 3-neck flask equipped with a stirrer, condenser, and dropping funnel and previously heated and purged with dry nitrogen, there were added 32.3 g (0.85 mole) of lithium aluminum hydride, 1,000 ml of diethyl ether and stirred for two hours at room temperature; 580 g (1.07 moles) of ethyl perfluoro-(4-ethylcyclohexane) carboxylate dissolved in 500 ml of diethyl ether were then added. Addition took place over 90 minutes with ice-bath cooling of the reaction flask. Next, 100ml of methyl alcohol mixed with 100 ml of diethyl ether were added to the reaction flask at ice-acetone temperature (−5° C.) to react with the excess lithium aluminum hydrides.

The contents of the flask were poured into a 4-liter beaker containing ice and hydrochloric acid, stirred and then poured into a separatory funnel and separated into two fractions. The water layer was washed with ether which was combined with the ether layer. This layer was then washed with saturated bicarbonate solution and water. The ether solution was dried over magnesium sulfate, filtered and stripped of ether by rotary flash evaporation. The yield of crude perfluoro-(4-ethylcyclohexane) carbinol was 432.5 g, or 79 percent by weight. The crude product was purified by distillation under reduced pressure, yielding 214.5 g of a material consisting predominantly of perfluoro-(4-ethylcyclohexane) carbinol and deemed to be a technical grade of such carbinol.

Several perfluoro-(4-alkyl cyclohexane) carbinols were prepared similarly. The boiling points of the thus prepared technical grade samples of these new compounds are:

B. Pt° C/Press.
    perfluoro(4-ethylcyclohexane) carbinol 76–96/20 mmHg
    perfluoro(4-isopropylcyclohexane)carbinol 76°–95 C/20 mmHg
    perfluoro(4-butylcyclohexane) carbinol 70°–80° C/20 mmHg

PREPARATION OF POLYMERIZABLE MONOMERS

EXAMPLE VII

Preparation of α,αDihydro perfluorocyclohexane carbinol methacrylate

To 124.4 g of α,αdihydro perfluorocyclohexane carbinol and 44.5 g of triethyl amine in 500cc of diethyl ether cooled in an ice bath was added dropwise 51.3 g of methacrylyl chloride. The ice bath was removed and the reaction allowed to remain at room temperature for 2 hrs., after which time water was added until two clear layers were obtained. The aqueous layer was extracted with ether and the ether solutions combined and washed with water, NaHCO₃, and water. After drying and evaporating ether, the crude ester was distilled. The main fraction, 96.5 g was obtained between 39°–43 °C. at 0.7mmHg.

Anal. Calc'd for $C_{11}F_{11}H_7O_2$: C, 34.8; H, 1.87; F, 55.0
Found: C, 35.7; H, 1.98; F, 57.9

$\alpha,\alpha$ - Dihydro perfluorocyclohexane carbinol acrylate can be prepared in an analogous manner from acrylyl chloride. This monomer has a boiling range of 29°–33 C. at 0.3mm.Hg.

Preparation of $\alpha,\alpha\alpha$-Dihydro perfluoro-4-methylcyclohexane carbinol methacrylate This monomer was prepared in a manner similar to that reported above. From 147.1g of carbinol was obtained 151 g of monomer ester having a boiling range of 60°–69° at 0.5mm.Hg.

The corresponding $\alpha,\alpha$-dihydroperfluoro-4-methylcyclohexane carbinol acrylate is prepared in the same manner, using acrylyl chloride as the reagent.

EXAMPLE VIII

The acrylate ester of perfluoro (4n. butyl cyclohexane) carbinol was prepared as follows:

To 214.5 (0.42 moles) of perfluoro (4-n.butylcylcohexane) carbinol and 45.5 of triethyl amine in 750 cc of ether cooled in an ice bath, 40.8 g (0.45 mole) of acrylyl chloride were added dropwise. The ice bath was removed and the reaction allowed to remain at room temperature for two hours, after which time water was added until two clear layers were obtained. The aqueous layer was extracted with ether and the ether solutions combined and washed with water, bicarbonate and again water. After drying and evaporating the ether, 211.5 g (93.7 percent yield) of the acrylate ester were obtained which were then distilled at 80°–95° C. at 1.0 mmHg.

Using the same procedure, exemplary acrylates and methacrylates were prepared in good yield, having physical properties as follows:

| | %Yield | BPt°C. |
|---|---|---|
| 4-$C_2F_5$-$C_6F_{10}$-$CH_2$-$O_2CCH=CH_2$ perfluoro-(4-ethylcyclohexane) carbinol acrylate | 83 | 36–37°C. 0.3 mmHg |
| 4-iso $C_3F_7$-$C_6F_{10}$-$CH_2$-$O_2CCH=CH_2$ perfluoro-(4-isopropylcyclohexane) carbinol acrylate | 70 | 63–86°C. 0.3 mmHg |
| 4-n.$C_4F_9$-$C_6F_{10}$-$CH_2O_2CCH=CH_2$ perfluoro-(4-n.butylcyclohexane) carbinol acrylate | 67 | 80–95°C. 1.0 mmHg |
| 4-n.$C_4F_9$-$C_6F_{10}$-$CH_2$-$O_2CC(CH_3)=CH_2$ perfluoro (4-n.butylcyclohexane) carbinol methacrylate | 86 | 60–70°C. .05 mmHg |
| 4-iso $C_3F_7$-$C_6F_{10}$-$CH_2$-$O_2CC(CH_3)=CH_2$ perfluoro-(4-isopropylcyclohexane) carbinol methacrylate | 89 | 90–97°C. 0.1 mmHg |
| perfluoro-(4-methyl cyclohexane) Carbinol methacrylate | 78 | 58–60°C. .05 mmHg |
| perfluoro cyclohexane carbinol acrylate | 78 | 29–33°C. 0.3 mmHg |
| perfluoro-cyclohexane carbinol methacrylate | 76 | 39–43°C. 0.7 mmHg |

Homo-polymers of the above-described acrylate and methacrylate esters can be prepared by the usual methods of polymerization known to the art. Illustrative examples are given below:

EXAMPLE IX

The following were charged into a pressure reactor previously purged with nitrogen and sealed after loading:

| | pbw |
|---|---|
| Perfluorocyclohexane carbinol methacrylate | 10 |
| Carbitol | 10 |
| Non-ionic surfactant (15% aqueous solution (Equal parts of octyl phenoxyethanols, one containing about 16 $C_2H_4O$ units and the other about 40 $C_2H_4O$ units per molecule) | 10 |
| Ammonium persulfate (1% solution) | 10 |
| Borax (1% solution) | 10 |

The reactor in a rotary bath heated at 45° C. After 16 hours there was 93 percent conversion to polymer. The slightly opaque latex obtained was coagulated to a polymer having a softening point of about 140° C. and an inherent viscosity of 1.2 deciliters/gm in m-hexafluoroxylene at 25° C. in a concentration of 0.5 gm/deciliter.

EXAMPLE X

An oil and water repellent fabric treating composition was prepared by mixing:

1 gram of the acrylate ester of perfluoro-(4-ethylcyclohexane) carbinol, 6 ml of surfactant in solution in 94 ml. distilled water comprising:

2 parts sodium lauryl sulfate 2 parts non-ionic surfactant, octylphenoxypolyethoxyethanol containing about 16 $C_2H_4O$ units; and 2 parts nonionic surfactant, octylphenoxypolyethoxyethanol containing about 30 $C_2H_4O$ units per molecule;

1 ml of acetone and 1 ml of 5 percent solution of ammonium persulfate initiator.

A 16 × 150 mm pyrex test tube was charged with the above ingredients, purged with nitrogen and sealed. The tube was placed in a shaking machine and agitated 15 minutes at room temperature; then placed in a bath at 82° C. and held there with agitation for 12 hours to form the homopolymer.

Other homopolymers of perfluoro cyclohexane $\alpha,\alpha$[ ], $\alpha$-dihydro carbinol acrylate or methacrylate can be similarly prepared by the methods of Examples IX and X above or as described below:

EXAMPLE XI 5 grams of the acrylate ester or perfluoro (4-isopropylcyclohexane) carbinol, 5 g of 15 percent surfactant (composed of equal amounts of nonionic surfactants having about 16 and 40 $C_2H_4O$ units per molecule of the octylphenoxpolyethoxyethanol type), 2 g of 2-(2-ethoxyethoxy) ethanol and 1 gram of 5 percent sodium acetate solution were placed in a 100 ml, 3-necked flask. The flask was stirred, heated to 45° C., and 7 g of a 3.7 percent aqueous solution of persulfate were added. Essentially 100 percent conversion of monomer to homopolymer was effected within three hours.

The above-described polymer compositions are applied to textile fabrics by any of the usual procedures commonly known in the art for imparting oil or water repellency. For example, the treating composition may be applied to the dry or pre-wetted fabric by padding, freed from excess liquid by squeezing through rollers, followed by drying at temperatures of 120° to 180° C.

In addition to the homopolymers prepared by the methods described in examples IX to XI above, copolymers were prepared in which the fluoro monomers were copolymerized with a commercial acrylate or methacrylate ester monomer containing up to 10 carbon atoms in the alcohol portion of the ester moiety.

EXAMPLE XII

A representative fluorine-containing segmented copolymer was prepared by agitating the fluoromonomer with a preformed polybutadiene emulsion in the presence of potassium persulfate at 50° C.

The polybutadiene emulsion was made by the following procedure:

An 8 ounce glass pressure bottle was charged with
6.99 grams acetone by weight,
0.28 grams dodecylmercaptan by weight,
1.04 grams octylphenoxypolyethoxyethanol having about 16 $C_2H_4O$ units per molecule,
1.04 grams octylphenoxypolyethoxyethanol having about 40 $C_2H_4O$ units per molecule,
27.16 grams water (doubly distilled),
14 grams butadiene and
7 grams potassium persulfate solution, 0.8 percent.

The bottle was purged with nitrogen, sealed, and placed in an end-over end rotating reactor heated to 50° C. for 16.5 hours. At the end of this time 81.5 percent conversion of monomer to polymer was observed.

A segmented fluorine containing copolymer was then made employing the above polybutadiene emulsion by charging a 20 × 125 mm screw capped test tube with the following:

5.8 grams polybutadiene emulsion (20 percent polymer),
1.16 grams of the methacrylate ester of perfluoro cyclohexane methanol, and
0.58 grams of 2 percent potassium persulfate solution.

The tube was purged with nitrogen, sealed, and heated at 50° C. for 24 hours in an end-over-end rotating reactor. The conversion to a segmented or block copolymer was essentially complete. The emulsions were freed of traces of coagulum by filtration through cheesecloth before use, when necessary. The weight of solids present was determined by placing a weighed sample of emulsion in an aluminum dish and drying at 150°–170° C. for ½ hour in a forced draft oven. On the basis of the total weight of solids obtained, the fluorocarbon content could be calculated for correlation with the oil and water repellency evaluation.

The procedure employed in evaluating the effectiveness of the aqueous emulsions for imparting oil repellency to fabric was designed to permit measurement of applied concentrations from a knowledge of the concentration of the component in the emulsion. Cloth samples were uniform rectangles of cotton fabric having an 80 × 80 thread count. When such untreated cotton was wet with water and squeezed through rollers, it retained an amount of water which was consistently uniform per unit area, and this water retention, was treated as the wet weight pickup. When the untreated cotton was wetted with an aqueous dispersion of a fluoro-containing modifier and squeezed through rollers, the fabric retained the same amount of water as before and the fabric retained an amount of modifier corresponding to that contained in the emulsion thus used to impregnate the fabric. The concentration of the modifier in the excess liquid squeezed from the fabric by the rollers was the same as in the initially employed impregnating emulsion. By this approach, the amount of impregnated modifier could be readily measured in each of a series of tests without the delays and expense involved in analyzing the impregnated samples for fluorine content.

After the fabric sample had been treated with the emulsion and freed from excess emulsion by squeezing through rollers, it was heated at 150°–175° C. for about 3 minutes to remove all water and to provide a dry fabric sample impregnated with the modifier.

The repellency of treated fabrics was measured by Standard Test No. 22–52, published in the 1952 Technical Manual and Yearbook of the American Association of Textile Chemists and colorists, vol. XXVIII, page 136. The "spray rating" is expressed on a 0 to 100 scale, wherein 100 is the highest possible rating.

The oil repellency test is based on the different penetrating properties of two hydrocarbon liquids, mineral oil and n-heptane. Mixtures of these two liquids are miscible in all proportions and show penetrating properties which increase with an increase in the n-heptane content of the mixture.

The oil repellency rating numbers were chosen to correspond with the A.A.T.C.C. Standard Spray Ratings which are now in use for testing water repellent finishes.

| Oil Repellency Rating | Percent Heptane | % Mineral Oil |
|---|---|---|
| 100(+) | 60 | 40 |
| 100 | 50 | 50 |
| 90 | 40 | 60 |
| 80 | 30 | 70 |
| 70 | 20 | 80 |
| 50 | 0 | 100 |
| 0 | 0 | |

Co-polymers of the type described in Example XII yielded emulsion latices which, when applied to cotton fabric, afforded water repellency and oil repellency as described in Table 3 in which table the fluoropolymer is identified in accordance with a list:

A. poly-[perfluoro-4-n.butylcyclohexane]methanol acrylate
B. poly-[perfluoro-4-ethycyclohexane] methanol acrylate
C. poly-[perfluoro cyclohexane]methanol methacrylate

TABLE 3

Oil and Water Resistance of Textiles Treated with Polymeric Derivatives of Perfluorocyclohexane Carboxylic Acids Fluoropolymer     Concentration of Fluoro-     Repellency

| Component | polymer component on cloth | oil | water |
|---|---|---|---|
| A | 1.0% | 100 | 100 |
| B | 1.0 | 100 | 80 |
| C | 0.5 | 100 | 90 |

These examples demonstrate the efficacy of the fluoropolymers of the invention as fabric treating agents to impart oil and water repellency in general.

Copolymer systems with perfluorinated cyclohexane methanol acrylate or methacrylate produce high oil and water repellency in fabrics to which these are applied at lower polymer concentration. Thus, a cotton fabric impregnated with a segmented copolymer of perfluoro (n-butyl cyclohexane) methanol acrylate and polybutadiene, and cured by the standard procedure, had a rating of 100 for both oil repellency and water repellency when the fabric contained 0.5 percent of fluorinated polymer. Even lower concentrations produce oil and water repellency to an effective degree.

Obviously, many modifications and variations are possible in the process and operation of the invention as above-described without departing from the spirit and scope thereof, and therefore only such limitations should be imposed as are indicated in the appended claims.

What is claimed is:

1. Compounds of the formula:

$$K_f C_6 F_{10} CH_2 OE$$

wherein $K_f$ is fluorine or a $C_1$ to $C_{10}$ perfluoroalkyl group, $C_6F_{10}$ is a perfluorinated cyclohexane moiety, and E is hydrogen or the group $$-\overset{O}{\underset{\|}{C}}-CR=CH_2,$$

where R is hydrogen or methyl, and homopolymers thereof.

2. Ester compounds according to claim 1 wherein E is the residue of an unsaturated acid selected from the group consisting of acrylic and methacrylic acid and homopolymers thereof.

3. Perfluoro-(4 ethyl cyclohexane) carbinol acrylate and homopolymers thereof.

4. Perfluoro cyclohexane $\alpha, \alpha$-dihydro carbinol.

5. Perfluoro-(4-methyl cyclohexane) $\alpha, \alpha$-dihydro carbinol.

6. Perfluoro cyclohexane $\alpha, \alpha$,-dihydro carbinol methacrylate and homopolymers thereof.

7. Perfluoro-(4-methyl cyclohexane) carbinol methacrylate and homopolymers thereof.

8. Perfluoro cyclohexane $\alpha, \alpha$,-dihydro carbinol acrylate and homopolymers thereof.

* * * * *